United States Patent Office.

EDWARD MILNER, OF MARQUETTE, MICHIGAN, ASSIGNOR TO CHARLES H. MACKINTOSH, OF STRATHROY, CANADA.

Letters Patent No. 111,133, dated January 24, 1871.

IMPROVEMENT IN COMPOUNDS FOR PRESERVING DRAIN-TILES, BRICKS, &c.

The Schedule referred to in these Letters Patent and making part of the same.

*To whom it may concern:*

Be it known that I, EDWARD MILNER, of Marquette, in the county of Marquette, and State of Michigan, have invented a new and useful Improvement in a Compound for Preserving Drain-Tile, Under-ground Tubing, &c.; and I do declare that the following is a true and accurate description thereof.

The nature of this invention relates to the composition of a fluid to be applied to drain-tiles, bricks for sewers, wooden water-pipes, and other articles exposed to decay from dampness.

The invention consists in coating or impregnating such articles with a compound prepared of the ingredients in or about the proportions hereinafter mentioned.

To make one gallon of the compound, the following ingredients are required:

| | |
|---|---|
| Crude gutta-percha | 1 ounce. |
| Alcohol | $\frac{1}{8}$ pint. |
| Turpentine | $\frac{1}{8}$ pint. |
| Coal-tar | 5 pints. |
| Common glue | $\frac{1}{4}$ pound. |
| Isinglass | 1 ounce. |
| Pulverized soap-stone | 12 ounces. |
| Asphaltum | 1½ pound. |
| Plaster of Paris, or Paris white | 2 pounds. |
| Japan varnish | 1 pint. |
| Gum-shellac | ½ pound |
| Sugar of lead | 2 ounces. |
| Gelatine | 1 ounce. |

In compounding large quantities, the alcohol, turpentine, sugar of lead, and gum-shellac are reduced to one half the proportionate amounts above named.

To prepare the compound for use, in a vessel containing sufficient warm water dissolve the gelatine, then add the isinglass, and afterward the glue. The gum-shellac, previously dissolved in the alcohol, is now poured in.

A second vessel, containing the coal-tar, is now to be placed over a slow fire, when thoroughly heated, the asphaltum and the contents of the first vessel are added, after which the remaining ingredients are added, the varnish last. The whole is then allowed to simmer slowly for fifteen minutes, being gently stirred to thoroughly almalgamate the ingredients, when the compound is ready for use, which is preferably by dipping the articles to be preserved therein, and immediately withdrawing them; they soon dry; the compound, if the material be very porous, permeating every part, and in all cases forming a hard enamel-like surface, impervious to water, and not to be affected by frost.

Drain-tiles are rendered by this process practically indestructible after being properly laid. Wooden and iron tubing, wooden and metallic tanks, bricks for sewers and foundations, in fact, all materials exposed to decay from moisture, will be effectually preserved if treated with the above-described compound.

What I claim as my invention, and desire to secure by Letters Patent, is—

A preserving compound, when composed of the ingredients and in or about the proportions herein described.

EDWARD MILNER.

Witnesses:
 FREDERICK EBERTS,
 SAMUEL J. SPRAY.